United States Patent
von Hein et al.

(10) Patent No.: US 11,562,406 B2
(45) Date of Patent: *Jan. 24, 2023

(54) OPTIMIZING WEBSITE ENVIRONMENTS

(71) Applicant: simplesurance GmbH, Berlin (DE)

(72) Inventors: Robin von Hein, Berlin (DE); Joachim von Bonin, Berlin (DE); Ismail Asci, Berlin (DE); Manuel Kester, Berlin (DE)

(73) Assignee: SIMPLESURANCE GMBH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,160

(22) Filed: Jan. 23, 2020

(65) Prior Publication Data

US 2020/0160406 A1    May 21, 2020

Related U.S. Application Data

(63) Continuation of application No. 15/224,447, filed on Jul. 29, 2016, now Pat. No. 10,559,014.

(Continued)

(51) Int. Cl.
*G06Q 30/00* (2012.01)
*G06Q 30/02* (2012.01)
(Continued)

(52) U.S. Cl.
CPC ..... *G06Q 30/0277* (2013.01); *G06F 16/9577* (2019.01); *G06F 16/972* (2019.01); *G06Q 30/012* (2013.01); *G06Q 40/08* (2013.01)

(58) Field of Classification Search
CPC .. G06Q 30/0277; G06Q 40/08; G06Q 30/012; G06Q 30/00; G06F 16/9577; G06F 16/972
See application file for complete search history.

(56) References Cited

U.S. PATENT DOCUMENTS

| | | |
|---|---|---|
| 9,734,503 B1 | 8/2017 | Gargi |
| 2002/0169654 A1 | 11/2002 | Santos et al. |

(Continued)

OTHER PUBLICATIONS

U.S. Appl. No. 15/224,447, "Final Office Action", dated Apr. 9, 2019, 12 pages.

(Continued)

*Primary Examiner* — Yehdega Retta
(74) *Attorney, Agent, or Firm* — Kilpatrick Townsend & Stockton LLP

(57) ABSTRACT

Provided are methods for optimizing presentation of additional items on web page based on item already presented on the web page. A method can include identifying first set of templates. The method can further include, for each of first plurality of requests, selecting first template, selecting first item, transmitting the first template to first client computer, and receiving interaction data from the first client computer specifying one or more interactions with the first template. The method can further include analyzing the interaction data to determine performance metric for each of the first set of templates and replacing at least one or more of the first set of templates and the first item. The method can further include, for each of second plurality of requests, selecting second template, selecting second item, and transmitting the second template to the second client computer. Presentation of additional items can be optimized remotely and automatically.

34 Claims, 10 Drawing Sheets

Related U.S. Application Data

(60) Provisional application No. 62/199,762, filed on Jul. 31, 2015.

(51) Int. Cl.
*G06Q 40/08* (2012.01)
*G06F 16/957* (2019.01)
*G06F 16/958* (2019.01)

(56) References Cited

U.S. PATENT DOCUMENTS

| | | | |
|---|---|---|---|
| 2004/0249712 A1* | 12/2004 | Brown | G06Q 30/0217 705/14.19 |
| 2007/0255617 A1 | 11/2007 | Maurone et al. | |
| 2007/0260520 A1* | 11/2007 | Jha | G06Q 30/0274 705/14.44 |
| 2007/0300152 A1 | 12/2007 | Baugher | |
| 2012/0158513 A1 | 6/2012 | Schoen et al. | |
| 2014/0279222 A1* | 9/2014 | Lampert | G06Q 30/0222 705/26.35 |
| 2015/0052036 A1* | 2/2015 | Vernal | G06Q 40/00 705/35 |
| 2016/0314485 A1 | 10/2016 | Moran et al. | |
| 2017/0032429 A1 | 2/2017 | Von Hein et al. | |

OTHER PUBLICATIONS

U.S. Appl. No. 15/224,447, "Notice of Allowance", dated Sep. 18, 2019, 7 pages.

U.S. Appl. No. 15/224,447, "Supplemental Notice of Allowability", dated Dec. 11, 2019, 2 pages.

U.S. Appl. No. 15/224,447, "Supplemental Notice of Allowability", dated Jan. 9, 2020, 2 pages.

PCT/IB2016/054594, "International Search Report and Written Opinion", dated Oct. 25, 2016, 13 pages.

* cited by examiner

300

| Items in your cart | Shipping & Payment | Confirmation |

1. Shipping Address

Holger Zieschank                                    Edit

Am Karlsbad 16
Berlin 10785
Berlin
Germany

Tel: 03456789

2. Shipping Method

Free Standard                                       Edit
Delivery by Aug 8, 2015

3. Payment Method

PayPal                                              Edit
Billing Address:  Holger Zieschank
                     Am Karlsbad 16
                     Berlin 10785
                     Berlin
                     Germany
                     Tel: 03456789    ⟵ 320

+Protect your OnePlus 3    322

| No Additional Protection 323 | On-Guard 12 Month 44.99€ 324 | On-Guard 24 Month 74.99€ 325 |

I have noted the Product Information and agreed on the Terms and Conditions.
The amount will be paid separately on invoice
    More information
326
    You will be covered in case of:
        ✓ Breakage (e.g., Display breakage)
        ✓ Damage due to incorrect use
        ✓ Damages by drops and falls
        ✓ Damage from liquids
        ✓ Excessive voltage, induction and short circuit
        ✓ Sabotage and vandalism
    Additional service & benefits:
        ✓ 24h online claim reporting
        ✓ Toll-free customer support
        ✓ Worry free claim process
        ✓ Worldwide coverage for claim handling
        ✓ For additional devices contact us at support@schutzlick.de
    Please find all contractual details in our Product information and in the Terms and Conditions

---

Order Summary                1 items

310

+Show more

Items Subtotal                    399.00€
Discount                           -0.00€
Shipping Fee                            -

Total                             399.00€
Got a promo code?                   Apply 330   Place Order
Estimated dispatch date Aug 2, 2016

? Do you need help?
  Please feel free to contact us

Our Commitments

🎁 Free shipping
   For orders over 100.00€

📅 Dispatched within 2 days
   to 31 countries & regions

🔄 15-day no-hassle return
   shipping costs covered

🛡 100% secure payments
   with reliable refund policy

Items in your cart — Shipping & Payment — Confirmation

1. Shipping Address

Holger Zieschank — Edit

Am Karlsbad 16
Berlin 10785
Berlin
Germany

Tel: 03456789

2. Shipping Method

Free Standard — Edit
Delivery by Aug 8, 2015

3. Payment Method

PayPal — Edit
Billing Address: Holger Zieschank
Am Karlsbad 16
Berlin 10785
Berlin
Germany
Tel: 03456789

340

+Protect your OnePlus 3

| No Additional Protection |  On-Guard 12 Month 44.99€ |  On-Guard 24 Month 74.99€ |

I have noted the Product Information and agreed on the Terms and Conditions.
The amount will be paid separately on invoice.

More information

---

| Order Summary | 1 items |

+Show more

| Items Subtotal | 399.00€ |
| Discount | -0.00€ |
| Shipping Fee | - |

| Total | 399.00€ |
| Got a promo code? | Apply |

Place Order

Estimated dispatch date Aug 2, 2016

? Do you need help?
Please feel free to contact us

Our Commitments

 Free shipping
For orders over 100.00€

 Dispatched within 2 days
to 31 countries & regions

 15-day no-hassle return
shipping costs covered

 100% secure payments
with reliable refund policy

OPTIMIZING WEBSITE ENVIRONMENTS

CROSS-REFERENCES TO RELATED APPLICATIONS

This application is a continuation of Non-Provisional U.S. patent application Ser. No. 15/224,447 filed Jul. 29, 2016, which claims priority to U.S. Patent Application No. 62/199,762, entitled "OPTIMIZING WEBSITE ENVIRONMENTS," and is related to U.S. patent application Ser. No. 15/204,202, entitled "INTEGRATION PLUGIN FOR IDENTIFYING AND PRESENTING ASSOCIATED ITEMS ON A WEB PAGE," which are incorporated by reference herein in their entirety for all purposes.

FIELD

Disclosure herein generally relates to providing one or more additional items to a web page that are associated with a base item already on the web page. Specifically, the disclosure relates to optimization of the placement and selection of the one or more additional items. In the disclosure herein, an item can be a product or service sold in an online store.

BACKGROUND

Conventionally, identifying and presenting additional items on a web page, where the additional items are associated with a base item already displayed on the web page is a very time consuming effort. In some cases, a user must locate the additional items on their own. In other cases, the website must correlate an additional item with the base item. In addition, presenting the additional items require the website to reprogram their layout every time the website makes a change. Thus, integration of additional items can require large amounts of programming on the website. In some examples, the additional items are not presented in an optimal manner for user experience, identification, and interaction. Because of the large amount of analysis needed, merchant's systems often offer generic, suboptimal additional items to customers. Embodiments of the disclosure herein address these and other problems, individually and collectively.

BRIEF SUMMARY

Provided are devices, computer-program products, and methods for optimizing presentation of additional items on a web page. In some implementations, a device, computer-program product, and method for customizing an online environment are provided. For example, a method can include identifying a first set of templates for providing to a first plurality of client computers for displaying on a web page. The method can further include performing a first number of steps for each of a first plurality of requests associated with a first client computer of the first plurality of client computers. The first number of steps can include selecting a first template from the first set of templates, selecting a first item, transmitting the first template to the first client computer, and receiving interaction data from the first client computer specifying one or more interactions made by the client computer with the first template on the web page. In some examples, the first template can include the first item.

The method can further include analyzing the interaction data to determine a performance metric for each of the first set of templates. In some examples, a conversion rate for the first template can be analyzed to determine the performance metric. In some examples, a match rate for the first template can be analyzed to determine the performance metric. The method can further include replacing at least one or more of the first set of templates and the first item based on the corresponding performance metrics to form a second set of templates.

The method can further include performing a second number of steps for each of a second plurality of requests associated with a second client computer of a second plurality of client computers. The second number of steps can include selecting a second template from the second set of templates, selecting a second item, and transmitting the second template to the second client computer that sent the request. In some examples, the second template can include the second item. In some examples, the second template can be selected based on a round-robin strategy. In some examples, the second template can be selected based on its dissimilarity to the one or more replaced templates from the first set of templates. In other examples, the second template can be selected randomly. In some examples, the second template can be selected based on a given distribution.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF THE DRAWINGS

FIG. 3A illustrates an example of a template block for a web page.

FIG. 3B illustrates an example of a template block with an additional item selected.

FIG. 6 illustrates an example of a first section of a plugin management user interface displaying statistics for several websites.

FIG. 7 illustrates an example of a second section of a plugin management user interface displaying information and statistics for template blocks.

FIG. 8 illustrates an example of a third section of a plugin management user interface displaying statistics for several websites.

DETAILED DESCRIPTION

Figure 1:
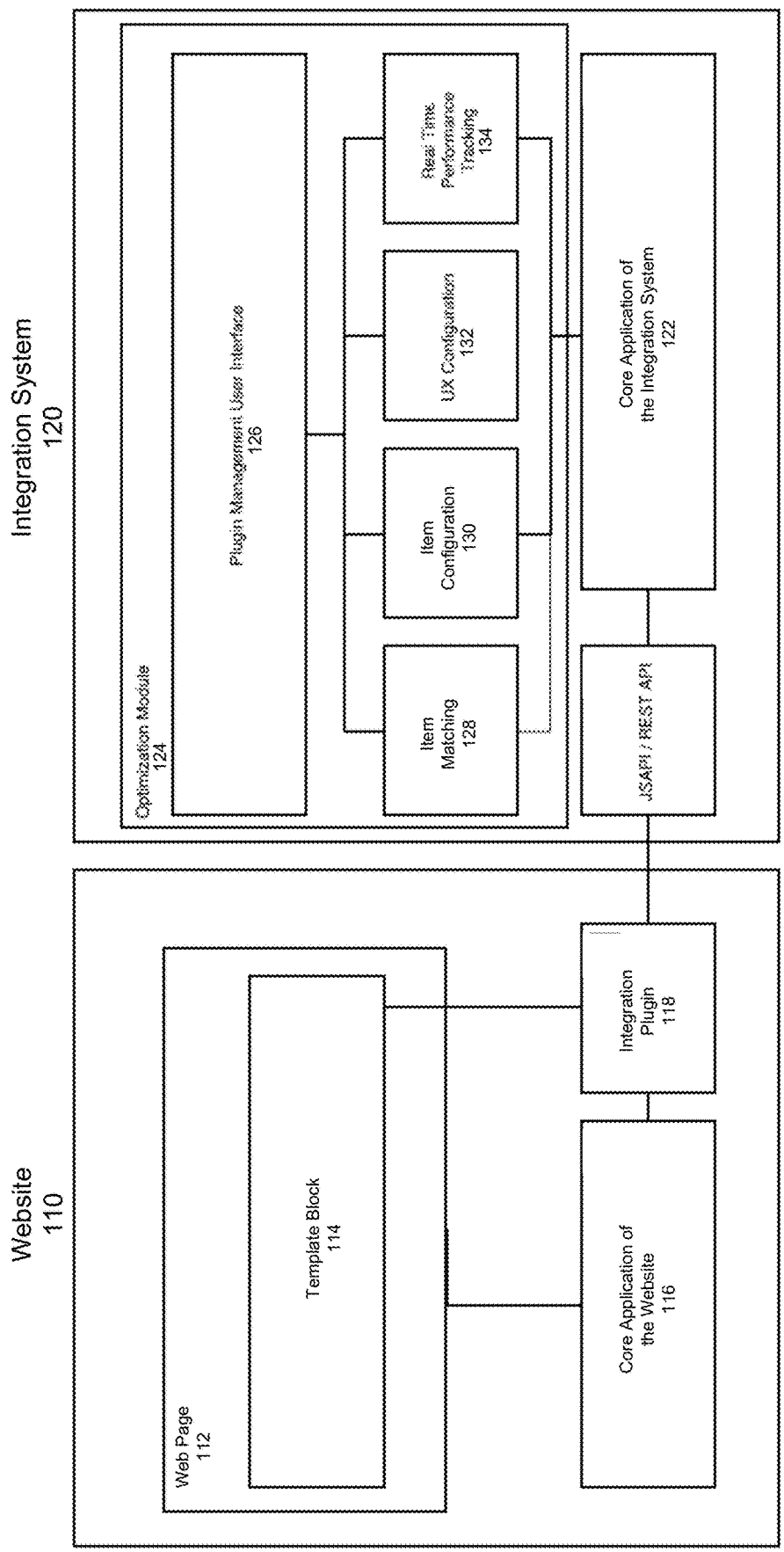
FIG. 1 illustrates an example of a website and an integration system.

An integration plugin can be integrated into an online environment for a website to present one or more additional items on a web page. In some examples, the one or more additional items can be associated with one or more base items that are already included on the web page. The integration plugin can enable automatic identification of the one or more additional items from a database to be placed on the web page. The integration plugin can also enable generation and rendering of customized template blocks to present the one or more additional items on the web page. The appearance of the template blocks can be adapted, configured, and optimized remotely from the web site. In some examples, a core application located remote from the website can communicate with the integration plugin. The core application can also provide item matching, item configuration, user experience configuring, performance tracking, and other services.

In some examples, an optimization module can communicate with an integration plugin to optimize the presentation and content of template blocks for the website. The optimization module can increase both conversion rates of additional items and matching rates of additional items to base items. A conversion rate can be a number of additional items selected compared to a number of base items associated with the additional items selected, thereby measuring how often an additional item is selected. The match rate can be a number of base items that are associated with at least one additional item compared to the total number of base items. The rates described above can be measured on a real-time basis for each website where an integration plugin is used.

The template block that presents the additional item can be configured, reconfigured, and optimized at any time without any effort or programming resources from the website. For example, through multiple iterations of A/B testing (as will be discussed below), a template block can be optimized in order to increase conversion rates without any effort or programming resources from the website. Many prior systems have an obstacle that they require a large amount of programming from the website to provide additional items, which can cause information technology (IT) resource bottlenecks for the website. As discussed in the disclosure herein, an item can include a product or a service.

I. Example Usage of an Integration Plugin

To provide one context that an integration plugin and optimization module can be used, a buying process on a website will now be described. In one example, an integration plugin can enable a website to cross sell or up sell an item (e.g., product insurances and warranty extensions) with other items (e.g., computers, phones, or any other product or service).

In one illustrative example, the integration plugin can be used in association with offering insurance for electronics, such as smartphones. For example, when a user is purchasing a smartphone, an offer for smartphone insurance can be displayed before the user confirms the purchase of the smartphone. Using the integration plugin, the purchase of the smartphone and the insurance can be a one-click solution, such that with one click the user could attach the smartphone insurance to the shopping basket and then finish the transaction seamlessly, without disturbing the buying process. By not disturbing the buying process, a conversion rate for one or more cross-selling and/or up-selling items for the online shop can improve.

In another illustrative example, a user can buy a bike online and, in the buying process, add theft insurance for the bike. Other examples include, but are not limited to, insurance and warranty extensions for various electronics (e.g., dishwashers, refrigerators, and watches), musical instruments, eyewear, car tires, and anything that can be bought and sold online. Other cross-selling and/or up-selling items can be a TV subscription, buyer protection service, or any other complimentary item.

In some examples, the integration plugin can take advantage of common information used during the buying process. For example, the user might not be asked to enter any additional information when adding on an additional item. The integration plugin can use information already entered by the user, or known by the website. For example, an additional item can require an email address and a unique identifier of an item associated with the additional item. For an electronic device, the unique identifier can be a serial number of the electronic device. If, for example, a user chooses to buy insurance using the integration plugin, the integration plugin can capture the user's email address and the serial number of the smartphone that is being purchased from the website.

In one illustrative example, an optimization module of the integration system can measure, in real time, a number of users buying an item (e.g. a bike) and a number of cross-selling and/or up-selling items sold (e.g., a theft insurance for the bike). Using the number of users and the number of cross-selling and/or up-selling items sold, the optimization module can calculate a conversion rate.

The integration plugin and the optimization module can be used to increase the conversion rate for an additional item of the website. In some examples, a presentation of the additional items can adapt based on the conversion rates. The presentation can also depend on items involved, the website, users that typically shop and/or buy from the website, and any other factor associated with possible clients purchasing items. For example, a lower-end shop selling cheaper items can have a completely different target group compared to a premium shop selling more expensive items. The different shops can require different additional items as well as different types of communication or presentation of the additional items.

In some examples, the integration plugin can be used to display an offer with one or more additional items received from the integration system. The offer can be presented with different display characteristics (e.g., message texts, headers, colors, logos, structure, user flow, etc.). In addition, one or more attributes of the additional item can be changed. For example, a length of time insurance lasts can be changed depending on a price point of the insurance. For another example, things covered under the insurance can be changed. By changing the one or more attributes, a price of the cross-selling or up-selling item can be made to fit a budget of a user.

II. Integration System

FIG. 1 illustrates an example of a website 110 and an integration system 120. The website 110 can include a core application of the website 116 to provide control and functionality of the website 110. The website 110 can send one or more web pages to a user's computer during an interaction between the user's computer and the website 110. In some examples, a web page 112 of the one or more web pages can include an item (e.g., a base item) and an integration plugin 118. The integration plugin 118 can provide a connection between the website 110 and the integration system 120. In some examples, an Application Programming Interface (API) can be used to facilitate communication between the website 110 and a core application of the integration system 122. The core application of the integration system 122 can provide control and functionality of the integration system 120.

The integration plugin 118 can work across different browsers using common technologies (e.g., JavaScript). The integration plugin 118 does not require individual customization based on a type of the website, allowing for easier display of the template block 114, transfer of user data, and item matching. Additionally, if a user selects an additional item, the integration plugin 118 can send information associated with the additional item to the core application of the integration system 122, which would forward the information to the real time performance tracking module 134 for tracking purposes.

The integration plugin 118 can also receive information associated with a base item on a web page (e.g., in a shopping cart or selected by a user) from the core application of the website 116. In other examples, the integration plugin 118 can request the information associated with the base item using specific tags and/or specific kind of application program interface (API) calls from the website 110. The integration plugin 118 can then send the information associated with the base item to the integration plugin 118 for analysis by the integration system 120. Because the information associated with the base item is not normalized across websites, the integration plugin 118 can format the information associated with the base item to a common format used by the integration system 120. The core application of the integration system 122 can receive the information associated with the base item from the integration plugin 118 to determine one or more additional items to present to the user from a database of items.

In some examples, information input by a user during an interaction with a website can also be sent to the core application of the integration system 122 from the integration plugin 118. The information input by the user can be used in relation to additional items (e.g., for required information for an insurance or future correspondence). Other information from a user or a web page that can be sent to the core application of the integration system 122 can be stored by the integration system 120 (e.g., an address, a name, or other information that can be entered by a user into a web page).

When a user selects a base item on the web page 112, the core application of the integration system 122 can receive a request from the user's computer (through the integration plugin 118) for an additional item for the base item. The core application of the integration system 122 can use a matching algorithm to attempt to identify one or more additional items for the base item. The one or more additional items can be selected from a database. The one or more additional items can be selected randomly, or by defined rules, such as for certain base items only product insurance with a 12 month period should be selected. The one or more additional items can be presented on the web page 112 using a template block 114 provided by the integration system 120. The template block 114, and any details associated with the template block 114, can be sent to the user's computer in response to the request from the user's computer.

In some examples, a base item can include one or more template blocks that can be used for additional items associated with the base item. In some examples, different base items can relate to different sets of template blocks. For example, a first base item can include three template blocks while a second base item can include four template blocks. In some examples, when a base item is selected, the integration system 120 can identify one or more template blocks associated with the base item. The one or more template blocks can be based on a category of the base item or other criteria. The one or more template blocks can also include additional item information (e.g., a name or an image of an additional item). In some examples, an additional item can include a specific configuration (e.g., a type and details of the additional item).

The integration system 120 can determine a format (e.g., a template block) to present the additional item to a user. The core application of the integration system 122 can respond to the integration plugin 118 with a customized template block and instructions for where to display the customized template block. To add the template block 114 to the web page 112, the web page 112 can include one or more hooks (e.g., a web hook). The one or more hooks can be located in various portions of the web page 112, to allow the template block 114 to be inserted into the various portions. Using the one or more hooks, the integration plugin 118 can insert the template block 114 into the web page 112. The content of the template block 114 can be sent from one or more servers associated with the integration system 120. By storing data and content remotely, the integration system 120 can allow for rapid and automated changes without needing to modify the website 110.

The template block 114 can be inserted in the web page 112 using two or more preconfigured page element identifiers that are received with the template block 114. One of the preconfigured page element identifiers can be a page element to hook the template block 114 onto. The other preconfigured page element identifier can be one or more page elements that can lead to any other page and thereby determine an end of an interaction with a specific page. Using the two or more preconfigured page element identifiers, information associated with an additional item can be displayed in the template block 114 at any stage during an interaction between a user and a website. Thus, even before the user is finishing the interaction, the user can be shown an additional item. The user can select it with one click, adding it to a shopping basket. The user can also confirm a purchase of the additional item.

To perform customization of the template block as discussed above, the integration system 120 can include an optimization module 124. The optimization module 124 can identify an additional item, identify how to present the additional item to a user, determine when to display the additional item on a web page, perform optimization of the entire process by analyzing responses of users to the additional item, or any combination thereof. The optimization module 124 can analyze users on the website 110, and allocate additional items or additional item types/categories to different template blocks. The optimization module 124 can measure performance of each of the template blocks in the website 110.

In some examples, different additional items can qualify to be displayed to a user at different price points. For example, a price of a first insurance product covering accidental damages and a price of a second insurance product covering losses can be higher than a third insurance product covering accidental damages and losses. The optimization module 124 can test, track, and analyze performance of each template block by displaying the template blocks to users in an A/B test manner, as described herein.

In some examples, the optimization module 124 can change a presentation and/or content of an additional item in the template block 114 based on how well previous additional items worked with either the same user or different users. In some examples, the optimization module 124 can determine whether a base item displayed on a web page of the website 110 is one for which an additional item should be shown. The determination can occur after the integration plugin 118 is installed, without further definition required by the website 110. In some examples, the optimization module 124 can also identify one or more web pages in a user's interaction with the website 110 where an additional item should be displayed to a user.

The optimization module 124 can analyze user's interactions with template blocks to determine which template block and what elements of the template block lead to successful selections of additional items. After measuring the performance rates of each template block, the optimization module 124 can reassign items to template blocks dynamically from the core application of the integration system 122 without having the website 110 do anything. The interaction data can include the user's interaction with the template block. Examples of interactions with the template block can include: whether a sale was made; whether the user selected or moused over certain text or images in the additional item; whether the user clicked on any links; whether the user began to enter any data for the additional item; the amount of time spent on the template block by the user; and other data pertaining to the user's decision to purchase or not purchase an additional item.

In some examples, the optimization module 124 can also analyze performance of each template block to identify a top one, two, or greater number of template blocks, and replace the lesser performing one or more template blocks with different one or more template block. A similar analysis of performance of each additional item can be performed. For example, a top one, two, or greater number of additional items for a base item can be identified, and lesser performing one or more additional items can be replaced with difference additional items.

In some examples, the optimization module 124 can identify replacement template blocks (1) that are similar to known, higher performing template blocks; (2) randomly; (3) using a given distribution; (4) by selecting template blocks that are most dissimilar to the template blocks to be replaced; or (5) by using various other strategies in order to ultimately find the optimal template blocks for increasing selection of additional items. In some examples, the replacement template blocks can be identified using a Round Robin strategy. The optimization module 124 can also use similar strategies to determine a template block to initially use for an additional item associated with a particular base item. Some template blocks can include multiple visual elements or features (e.g., boxes or graphics). The optimization module 124 can determine that template blocks including or missing certain visual elements result in more selection of additional items.

The integration system 120 can include a database for storing template block information, which can include an additional item, a configuration of the additional item, a visual appearance of a template block for displaying the additional item, an interaction with the template block, and a performance of the additional item using the template block. The template block information can be used to build one or more template blocks. A template block can include Hypertext Markup Language (HTML) structure information, Cascading Style Sheets (CSS) style information, and JavaScript for functionality of the template block. In some examples, the template block can also include meta information (e.g., supported product categories). The database can also include website information for each website. The website information can include additional item selections, base item selections, and conversion rates for additional items and base items of a website. The integration system 120 can analyze the template block information and the website information included in the database. After a certain threshold number of interactions with a template block and/or additional item, the optimization module 124 can have a basis for determining that one or more template blocks are performing the best for an additional item. One template block can be substituted for another template block after determining the other template block is underperforming.

III. Components of the Optimization Module

The optimization module 124 can include a plugin management user interface 126. The plugin management user interface 126 can provide a user interface for a user associated with the integration system 120 to interact with the optimization module 124. The optimization module 124 can use at least one or more of an item matching module 128, an item configuration module 130, a user experience (UX) configuration module 132, a real time performance tracking module 134, or any combination thereof.

The item matching module 128 can match a base item on a web page to one or more additional items. In some examples, the item matching module 128 can determine one or more base items that are not matched and which base items cannot be matched. For example, a part for a charger for a mobile phone can be a standalone product for which a match might not be able to be made. In such examples, the integration system 120 can either create one or more new template blocks or determine that there is no possible match for the base item. In either case, the item matching module 128 can store a correlation, a potential correlation, or a lack of correlation in a database. The database can include one or more base items that are available in the website 110. The database can also include one or more base items that match or do not match for additional item purposes. The database can be updated when changes are made to the website 110, including when base items change, new base items are introduced, or the website 110 changes its hierarchy or its way of keeping master data for a product/service. The database can include a category ID and category name to be used in a matching process of base items with additional items.

The integration system 120 can alert an operator of one or more unmatched base items. The integration system 120 can identify new suggestions for additional items. In some examples, the integration system 120 can notify the operator of the new suggestions. Matching of base items and additional items can be based on categories used by the website 110.

The item configuration module 130 can determine one or more attributes of an additional item for a user (e.g., cost and terms of an insurance). The item configuration module 130 can then determine how to configure the additional item for a user. In some examples, the item configuration module 130 can select, from a list of variants of an additional items and price points. For example, insurance and theft protection can be offered for a first customer while only insurance is offered for a second customer.

The UX configuration module 132 can be used to optimize the presentation of the additional item to the user. The UX configuration module 132 can determine a layout, format, or any combination for the additional item in a template block. For example, graphics, text, headers, or other visual display components of the template block can be changed. The changes to the template block can be performed by the integration system 120, and not require action by the website 110. The content of the template block can be located and changed using the integration system 120. The UX configuration module 132 can allow more optimized template blocks to be chosen by the integration system 120 and used within the website 110 automatically.

An item category can be provided to the UX configuration module 132, which can determine one or more template blocks to use for an additional item based on the item category. The UX configuration module 132 can apply a variety of strategies to determine a template block to use. Examples of strategies can include a round robin strategy, selecting each template block with a specified percentage, or selecting each template block a randomized percentage of times.

The UX configuration module 132 can also use statistics to determine a template block to use. The UX configuration module 132 can be capable of identifying, after a few iterations, one or more template blocks that are producing the best results for an additional item, a base item, or an item category. In some examples, the UX configuration module 132 can continue testing after a highest performing template is selected. For example, the UX configuration module 132 can determine to apply the highest performing template block a higher percentage of time (e.g., 60-70%). In such an example, the UX configuration module 132 can use other template blocks a lower percentage of time to see if they might perform better.

When a new website is being configured, one or more template blocks can be assigned to certain base items and/or item categories. The UX configuration module 132 can be capable of selecting one or more template blocks to apply initially, and can adjust the one or more template blocks based on results. In some examples, the UX configuration module 132 can analyze results from iteration to iteration and replace template blocks. The UX configuration module 132 can require a set minimum threshold number of total interactions to be tested for each template block before making a decision on the efficacy of each template block. Once the set minimum threshold number of total interactions is reached, the UX configuration module 132 can compare a conversion rate for a template block with other conversation rates for other template blocks that also have met the set minimum threshold of total interactions.

The UX configuration module 132 can determine to use a certain number of highly rated template blocks (e.g., the highest or the top two template blocks). For example, there can be four template blocks for a particular category. The UX configuration module 132 can remove the bottom two performing template blocks and possibly add two more new template blocks. The UX configuration module 132 can continue the process again until it can make another determination of the best template block or template blocks to apply. That process can continue until the integration system 120 recognizes a maximum or near-maximum conversion rate (e.g., changes are less than a threshold). How long this optimization process will take can vary for each website. It can vary for example, depending on the type of item categories, the target group of the specific website, or other factors.

The real time performance tracking module 134 can track an interaction with a template block by the user. In some examples, the real time performance tracking module 134 can provide real-time performance tracking of data including at least one or more of: (1) whether a user completed an interaction with an additional item included, (2) whether the user completed an interaction without the additional item included, (3) whether the user clicked on the additional item, (4) or any combination thereof.

Using the data recited above, the real time performance tracking module 134 can track match rates and/or conversion rates of base items and additional items associated with the website 110. The real time performance tracking module 134 can collect information from the website to measure the conversion rate. For example, a conversion rate of 10% would be present if a shop sells 100 bikes, and for those 100 bikes, 10 product insurances are purchased. The completed information can be used with monitoring and optimization of conversion rates.

The real time performance tracking module 134 can also track the number of uncompleted sales for the website 110 and how many times an additional item was displayed and what the rejection rate was for the additional item. The rejection rate can, for example, indicate when a user begins an interaction with a website, but the user never gets to the end of the interaction to actually finish the interaction.

Additionally, there can be several optimization cycles in order to maximize conversion rates. The real time performance tracking module 134 can track impressions of users, meaning that it can track each time a user is progressing though an interaction with a website. For example, real time performance tracking module 134 can track each time a template block is displayed. The real time performance tracking module 134 can determine whether to display an additional item (e.g., whether the additional item is insurable or whether the item matching module 128 has identified an additional item for the time being displayed). The real time performance tracking module 134 can track completed sales by users and identify a difference between selected sales (where an additional item was selected with a base item), non-selected sales, (where an additional item was not selected with a base item), and non-matched sales (where an additional item was not shown with a base item).

The selected and non-selected information can be important to determine the match rate for the website 110. It can be desirable to be match additional items to as many base items in the website 110 as possible. If a new base item is added to the website 110, the new base item can be identified and matched to one or more additional items.

By automating or semi-automating the review process for the item matching module 128, the optimization module 124 can also solve a manual review and update problem that exists in other systems. For example, there can be a semi-automated item matching of all base items from the website, with a person approving matches. For another example, the real time performance tracking module 134 can flag for review a change in the match rates or conversation rates. In some examples, a person can be reviewing the flags. The same process described above for new base items can start over to review all base items in the website 110. The process can occur to change additional items associated with a base item displayed on a web page and change presentation of the additional items based on previous interactions. The real time performance tracking module 134 can store information regarding an additional item that was changed from a base item or a presentation that was changed based on previous interactions. In such examples, the information can be displayed in the plugin management user interface 126.

In some examples, the optimization module 124 can run one or more A/B tests for the website 110. A/B tests can compare two versions of a template block to identify a better template block. The A/B tests can allow the optimization module 124 to identify the best performing template block. The A/B tests can also allow identification of one or more additional items with the highest conversion rates. For example, if there are three templates for a certain item category, the optimization module 124 can cause a first template block to be displayed to ⅓ of users, a second template block to ⅓ of the users, and a third template block to ⅓ of the users. A person of ordinary skill in the art will recognize that the percentage a template block is offered can be any percent, not just separated evenly between the available template blocks. The optimization module 124 can then measure the conversion rate for each of the three templates. After several iterations, the conversion rate can be maximized accordingly using the best performing template block and/or additional item.

Goals for the optimization module 124 can include increasing sales volume, revenue, and/or margin for a website. Optimizing the conversion rate can help to achieve the goals. Another element that the optimization module 124 can help to increase is the number of additional items matched with base items. The match rate can correspond to the number of additional items associated with a base item compared to the number of base items where an additional item is actually displayed.

When there are new base items introduced into the website 110, there can be initially very few if any corresponding matched additional items. The item matching module 128 can determine which additional items are associated with base items and should be presented along with the base items. By analyzing the data for additional items being sold, and knowing which additional items are related to a new base item, the item matching module 128 can determine an initial set of potential additional items for the new base item. The real time performance tracking module 134 can monitor template block performance over various time frames (e.g., a monthly basis, a weekly basis, or in real time).

Figure 2:
FIG. 2 illustrates an example of a user interface for selecting template blocks for categories of items.

FIG. 2 illustrates an example of a user interface for selecting template blocks for categories of items. In the examples, there are three categories of items: glasses, smartphones, and electronics. For each category, one or more template blocks can be selected. While FIG. 2 illustrates four templates per category, a person of ordinary skill in the art will recognize that there can be more or less options. For each template block added to a category, a percentage of traffic to be allocated to that template block can be specified. When there is only one template block selected, 100% of the traffic can be allocated to the one template block.

In FIG. 2, the smartphone category includes four different template blocks selected. Each template block includes a percentage that traffic will be allocated to the template block. In some examples, the percentages for all of the template blocks for a particular category should add up to 100%. For examples, template blocks 3 and 4 of the smartphone category are applied 10 percent of the time each; template block 2 is applied 20 percent of the time; and template block 1 is applied for the balance, which in this example is 60 percent of the time.

For a particular item category, one or more different template blocks can be used. In some examples, there can be subsets of template blocks that share more features than others. For example, an item category can include 40 associated template blocks, and there can be subsets of 10 template blocks where all of the members in a subset share similar characteristics to each other. For example, a first group of template blocks can share linguistic features that specify 12 months as the length of an insurance contract while a second group of template blocks specify one year. In some examples, two or more template blocks can share similar initial wording. In some examples, two or more template blocks can share a same number of checkboxes or include the same positioning of graphical elements. In some examples, two or more template blocks can include less information or information in a more condensed format than in other template blocks.

IV. Examples of Template Blocks

Figure 4:
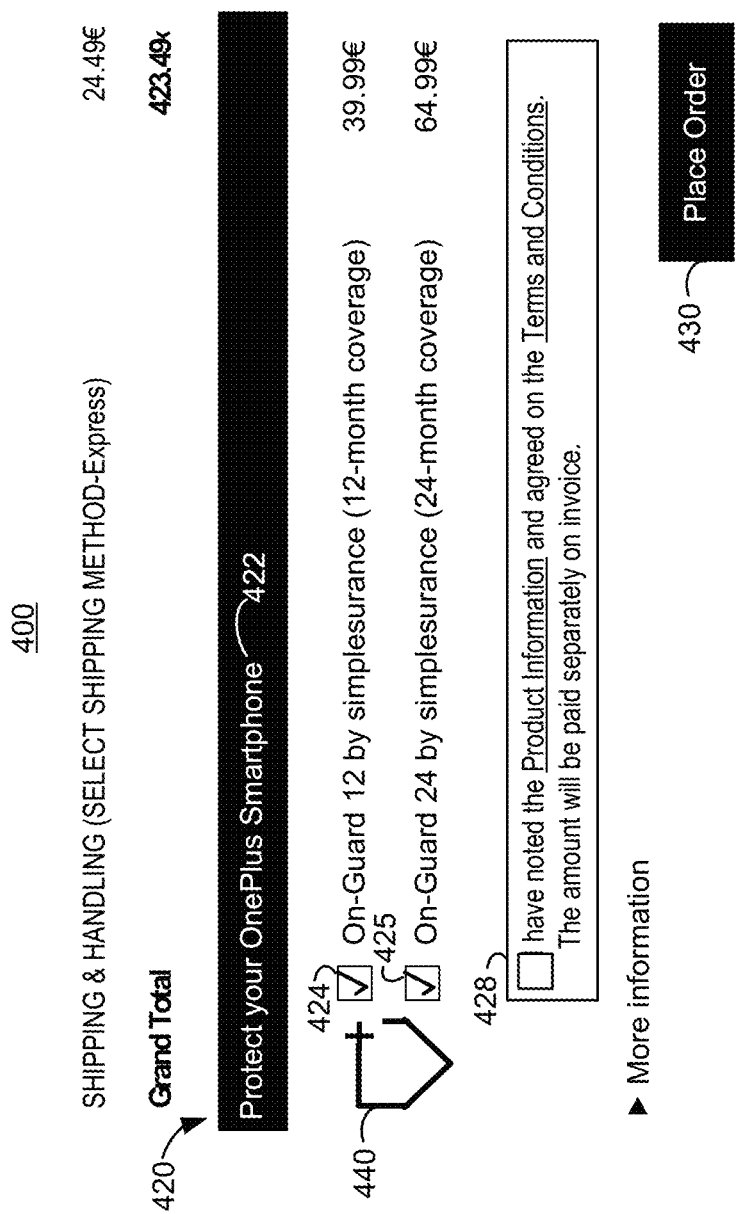
FIG. 4 illustrates another example of a template block for a web page.

FIGS. 3 and 4 illustrate variants of template blocks. The variants can differ in how additional items are presented (e.g., color, wording, graphics, etc.). In each of the figures, a portion of a web page is depicted. In the web pages, template blocks are depicted including an additional item below a price of a base item. A person of ordinary skill in the art will recognize that the template blocks can be located in other locations on the web pages. In some examples, one or more attributes of a template block can be changed, including a wording of the template block, a visual appearance of the template block (e.g., font style, font color, etc.), a flow of the template block (e.g., interactions with the template block and behavior of the template block), and a structure of the template block (e.g., whether certain elements are included in the template block). Many different template blocks can be present to make sure that there are the best possible combinations available.

FIG. 3A illustrates an example of a template block 320 for a web page 300. The web page 300 includes a base item 310 (i.e., "OnePlus 3 Graphit"). In some examples, the template block 320 can be controlled and managed by an integration plugin. The template block 320 can include a heading 322 that provides a short description of what is in the template block 320 (e.g., "Protect your OnePlus 3").

The template block 320 can further include radio buttons (e.g., first radio button 323, a second radio button 324, and a third radio button 325). The first radio button 323 can be associated with not adding an additional item. In some examples, the first radio button 323 can be selected by default. The second radio button 324 can be associated with a first additional item (e.g., "On-Guard 12 Month"). By selecting the second radio button 324, the first additional item can be selected. The third radio button 325 can be associated with a second additional item (e.g., "On-Guard 24 Month"). By selecting the third radio button 325, the second additional item can be selected. In some examples, the first additional item and the second additional item can be different variants of a single additional item. In other examples, the first additional item and the second additional item can be different additional items.

The template block 320 can further include a description 326. The description 326 can describe the additional item. Content for the description 326 can be included with the template block 320 when sent to the web page 300. The web page 300 can further include a button 330 to complete an interaction with the website. For example, the button 330 can place an order associated with the base item and the additional item, if selected.

FIG. 3B illustrates an example of the template block 340 with an additional item selected. The additional item can be selected by activating a radio button (e.g., the second radio button 324. By activating the second radio button 324, the template block 340 can change to reflect the indication by the user. For example, in FIG. 3B, a border of the radio button 324 is turned to red. The description 326, illustrated in FIG. 3A, can also change (e.g., be removed or hidden). In some examples, the changes to the template block 340 can be handled by the integration plugin mentioned in FIG. 3A. With the additional item selected, the button 330 can complete an interaction with both the base item and the additional item.

FIG. 4 illustrates another example of a template block 420 for a web page 400. The template block 420 can include one or more checkboxes (e.g., a first checkbox button 424 and a second checkbox 425) to select one or more additional items (e.g., "On-Guard 12" and "On-Guard 24" respectively). In some examples, the template block 420 can further include a terms and conditions check box 428 and a place order button 430. The terms and conditions check box 428 can be required to be activated before an additional item is added to an order.

In some examples, the template block 420 can further include an additional icon 440. The additional icon 440 can be any type of media content or graphic that is used in a template block.

In some examples, the template block 420 can share the same description as the template block 320. In some examples, the web page 400 can be the web page 300, illustrating that a different template block can be used on the same web page. In addition, the web page 400 can include the base item 310, illustrating that a different template block can be used for the same base item.

V. Process for Customizing a Template Block

For the process of selecting one or more optimal template blocks for additional items in order to increase conversion and match rates, the integration system 120 can use customized offer template blocks, such that the appearance of the customized offer template blocks is adaptive, configurable, and optimized remotely (e.g., on the Integration system 120 rather than the Website 110).

Figure 5:
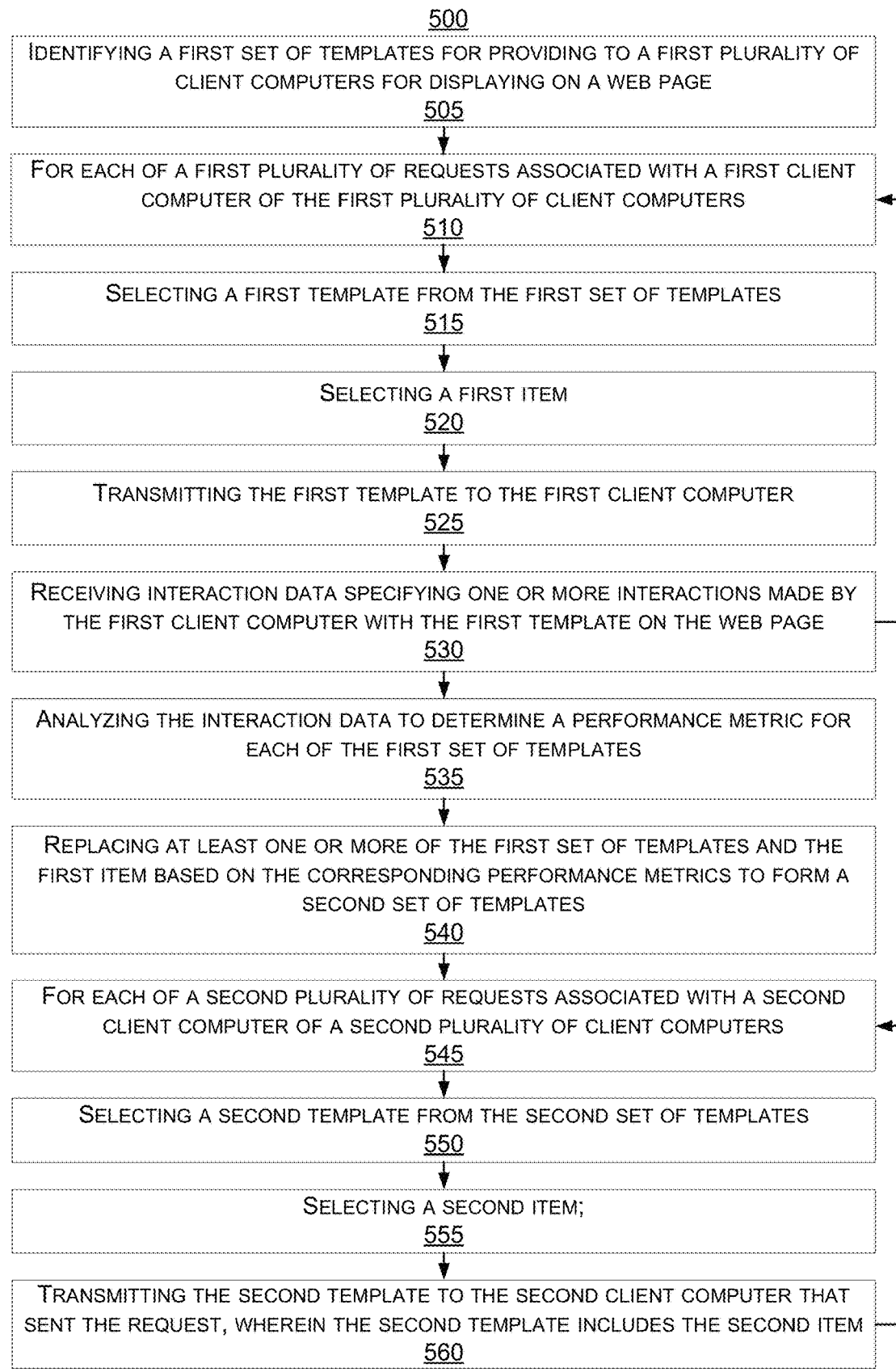
FIG. 5 is a flowchart of a method for optimizing template blocks for a website.

FIG. 5 is a flowchart of a process 500 for optimizing template blocks for a website. The process 500 can be performed by a server computer (e.g., the server computer system described in FIG. 9 below). Process 500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 505, the process 500 includes identifying a first set of templates for providing to a first plurality of client computers for displaying on a web page. In some examples, the first set of templates can be one or more template blocks, as discussed herein. In some examples, a template can be sent to a first client computer of the first plurality of client computers when the first client computer is viewing the web page. In such examples, the web page can include a base item. The base item can be an item of one or more items on the web page. In some examples, the base item can be selected by a user. The template can include one or more additional items that are associated with the base item. In some examples, the web page can include one or more base items. In some examples, the one or more additional items associated with the base item can be requested. In some examples, an initial set of templates can be determined by a server computer to be sent to the first plurality of client computers.

At block 510, the process 500 includes for each of a first plurality of requests associated with a first client computer of the first plurality of client computers, performing one or more steps, described in blocks 515-530. In some examples the first plurality of requests can be caused by an integration plugin on the first client computer. At block 515, the process 500 includes selecting a first template from the first set of templates. The first template can be selected in a number of ways described herein, including by a pre-defined rule, randomly, by a distribution, or other method At block 520, the process 500 includes selecting a first item, sometimes referred to as an additional item herein. In some examples, the first template can include the first item. The first item can be associated with a base item on the web page.

At block 525, the process 500 includes transmitting the first template to the first client computer. In some examples, the first client computer can display the first template to a user on the web page. The first template can include an interactive component (e.g., a checkbox or a button) for the first item. In some examples, the interactive component can allow the user to select (or express interest in) the first item.

At block 530, the process 500 includes receiving, from the first client computer, interaction data specifying one or more interactions made by the first client computer with the first template on the web page. In some examples, the interaction data can include information pertaining to a base item, whether an additional item was selected, the amount of time the interaction took to perform an action (e.g., select an additional item, proceed to a next web page, or other actions that can be detected on a web page), and other various details regarding the client computer interaction with the web site.

At block 535, the process 500 includes analyzing the interaction data to determine a performance metric for each of the first set of templates. The data may be analyzed to determine whether a template block and/or an additional item was successful (e.g., where the additional item was selected), nearly successful (e.g., were the additional item was initially selected but was later unselected or an interaction with the additional item was not selected), not successful (e.g., the additional item was not selected), or at some other level of efficacy. The efficacy of each template block and additional item related to the base item can be analyzed and data pertaining to it may be stored in a database system. In some examples, different price points for additional items can also be analyzed.

At block 540, the process 500 includes replacing at least one or more of the first set of templates and the first item based on the corresponding performance metrics to form a second set of templates. After analyzing the performance metrics, it may be determined that one or more of the templates should be replaced, for example if it did not produce a successful conversion rate for the first item. In other examples, it may be determined that one or more of the templates should be replaced because a time has elapsed since the one or more of the templates have been replaced.

At block 545, the process 500 includes for each of a second plurality of requests associated with a second client computer of a second plurality of client computers, performing one or more steps, described in blocks 550-560. At block 550, the process 500 includes selecting a second template from the second set of templates. At block 555, the process 500 includes selecting a second item. In some examples, the second template can include the second item. As described above, the second item can be referred to as an additional item herein.

At block 560, the process 500 includes transmitting the second template to the second client computer that sent the request. In some examples, additional requests for template blocks can be made by the integration plugin from one or more client systems. In such examples, the server computer can determine a set of appropriate templates to send. This process may continue until an appropriate convergence rate is reached for one or more metrics. In some examples, the appropriate convergence rate can indicate when a certain number of conversions or matches are reached for a base item and additional item combination.

VI. Plugin Management User Interface

Figure 6:
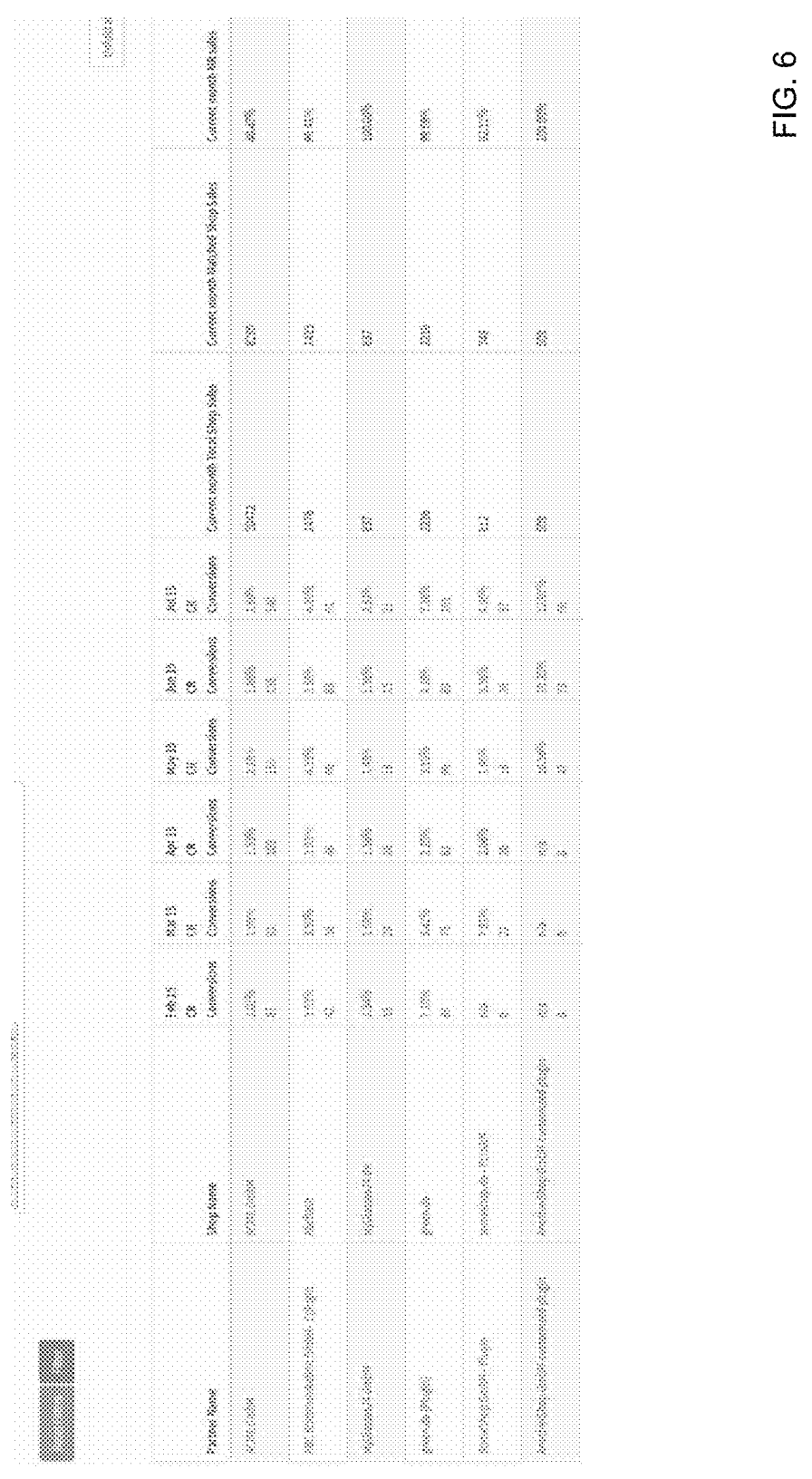

FIG. 6 illustrates an example of a first section of a plugin management user interface displaying statistics for several websites. In the first section of the plugin management user interface, each row can be associated with a different website. The statistics shown include conversion rates for various time frames (e.g., February 2015, March 2015, April 2015, May 2015, June 2015, and July 2015). The statistics shown further include current month total sales, current month matched sales, and a percentage of current month matched sales of the current month total sales. A person of ordinary skill in art will recognize that more or less statistics can be shown.

Figure 7:
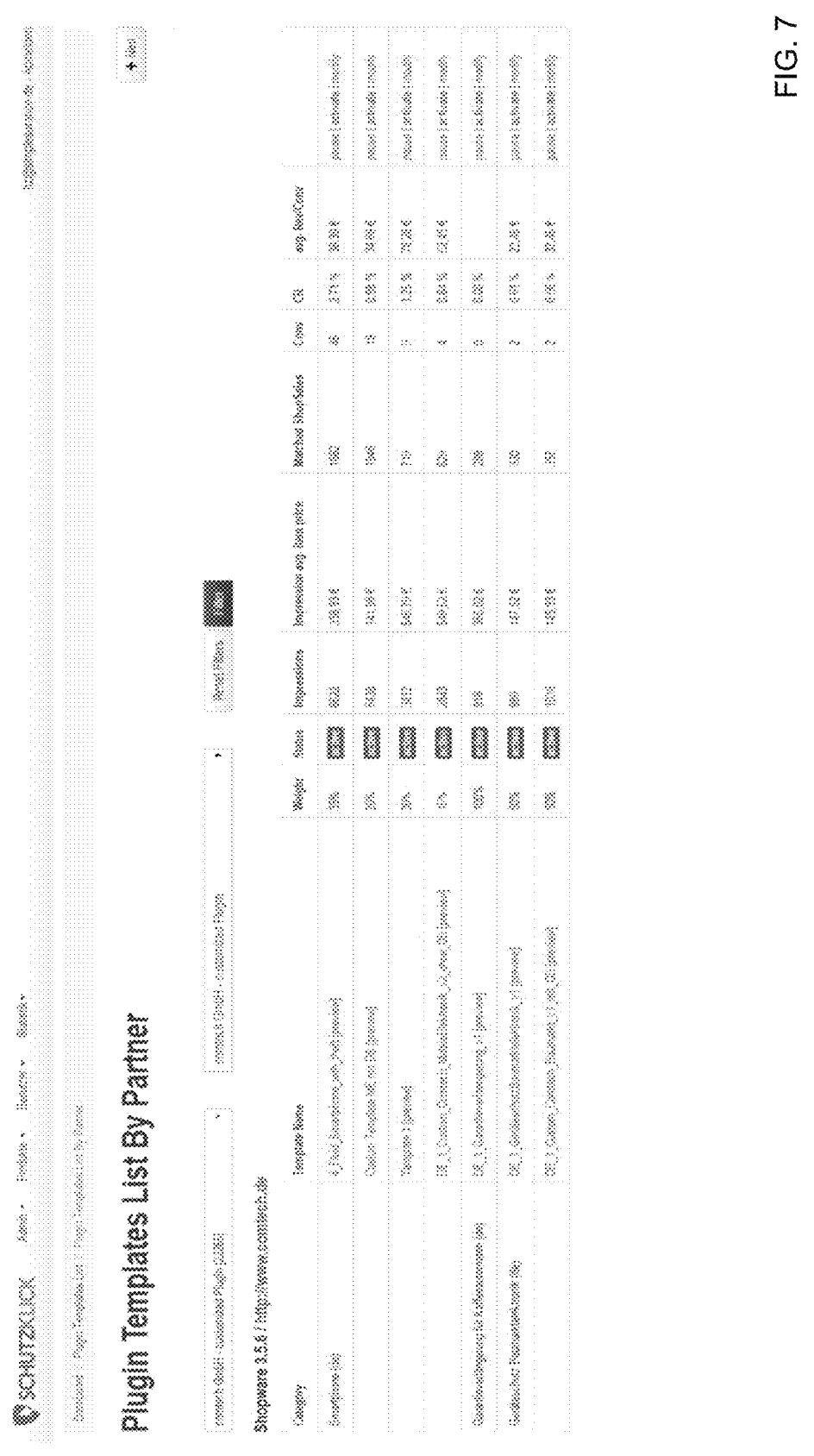

FIG. 7 illustrates an example of a second section of a plugin management user interface displaying information and statistics for template blocks. The second section of the plugin management user interface can include one or more item categories (e.g., "Smartphone (de)"). An item category can include one or more template blocks that can be associated with the item category. For example, the smartphone category includes four different template blocks. In addition, a template block can be associated with a weight. The weight can indicate a percentage that the template block should be given to users in comparison to other template blocks associated with the same item category. For example, the weights for the four smartphone template blocks can be 35, 20, 30, and 15 (which add up to 100).

A template block can further be associated with a status of the template block. The status can indicate whether the template block is currently an option that may be shown to user. Examples of statuses can be active or paused. A person of ordinary skill in the art will recognize that other statuses can be used.

A template block can further be associated with a number of impressions of the template block. The number of impressions can indicate a number of times a user has received the template block. A template block can further be associated with an average item price of items included in the template block. The average item price can be an average price of each base item that is included in the template block.

A template block can further be associated with a number of conversions for the template block. The number of conversions can indicate the number of impressions that an additional item was selected with a base item. A template block can further be associated with a conversion rate for the template block (as discussed above). A template block can further be associated with average revenue received for each conversion.

In some examples, an operator using the plugin management user interface can make a decision based on the statistics calculated as to which template blocks to use and at what percent the template blocks should be presented to a user. In other embodiments, the integration system 120 can determine one or more templates to use based on pre-defined or dynamic rules. In this example, the template block with a 2.71% conversion rate can be used more often, or the template with the highest average revenue. The integration system 120 can be manually administered to allow the operator to change which templates are being used, or it can be programmed to optimally select templates based on a set of criteria or rules.

Figure 8:
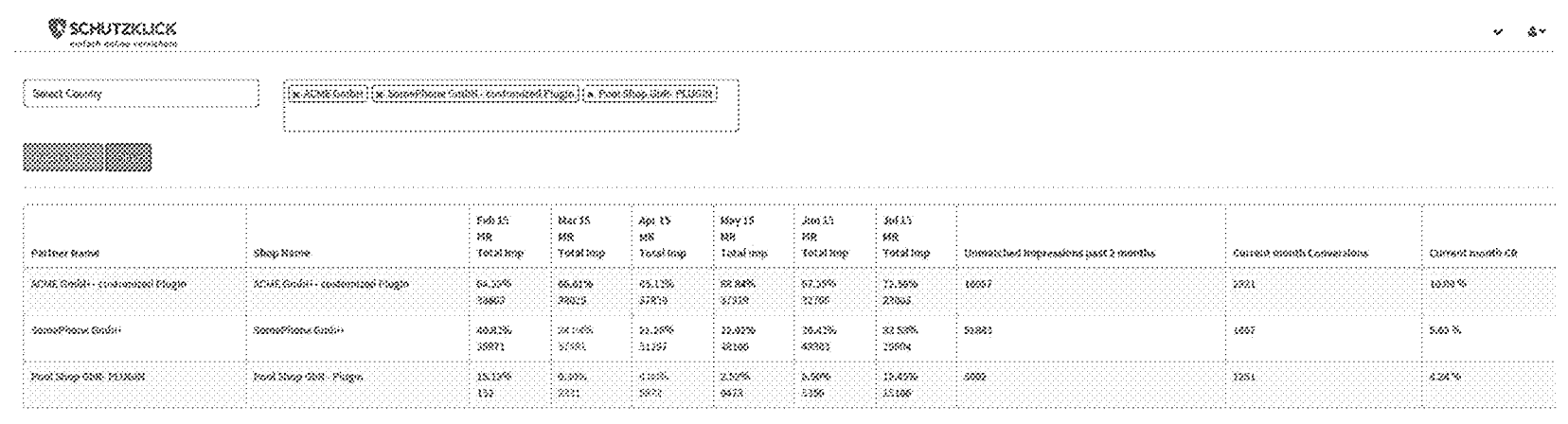

FIG. 8 illustrates an example of a third section of a plugin management user interface displaying statistics for several websites. The statistics for each website can include a match rate for each month over several months. The match rate can be a number of base items shown to a user that have been matched to an additional item. The statistics can further include a total number of impressions for each month over several months. The statistics can further include a total match rate and impressions for one or more months (aggregated if for more than one month). The statistics can further include a number of unmatched impressions for one or more months. An unmatched impressed can occur when a user uses a website and a base item is not matched to an additional item. The statistics can further include a total number of conversions for one or more months (including a current month or a previous month). In some examples, the statistics can further include a conversion rate for a current month, one or more previous months, or any combination thereof.

VII. Computer System

Figure 9:
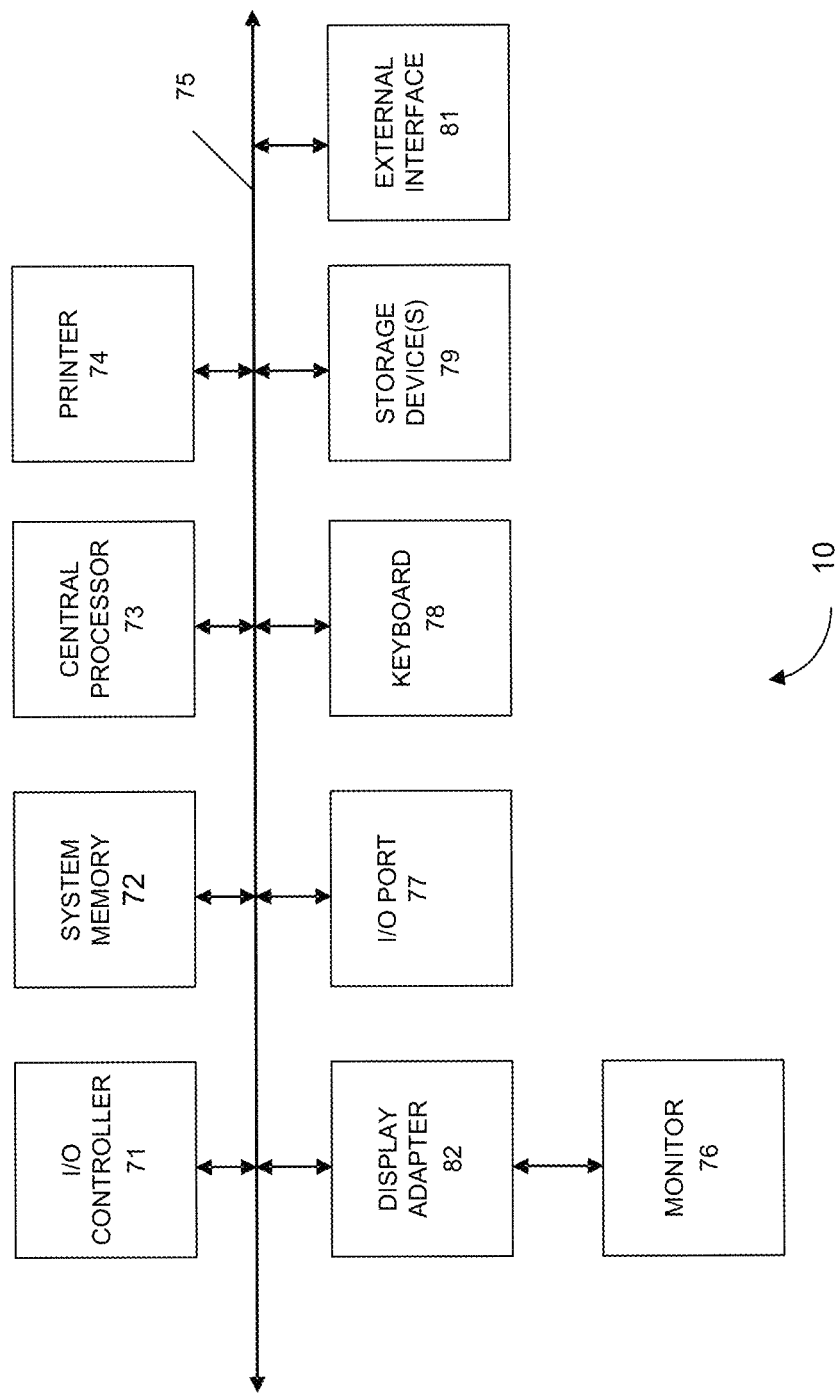
FIG. 9 illustrates an example of a block diagram for a computer system.

Any of the computer systems mentioned herein may utilize any suitable number of subsystems. Examples of such subsystems are shown in FIG. 9 in computer system 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art

What is claimed is:

1. A method of customizing an online environment, the method comprising, performing by an integration computer system:

identifying, by an optimization module of the integration computer system, a first set of templates for providing to a first plurality of client computers for displaying on a web page, wherein the first set of templates are stored in a memory and correspond with an integration plugin component that, when activated, is configured to add one or more interactive components to the web page;

for each of a first plurality of requests associated with the first plurality of client computers:

receiving, by an application of the integration computer system from a first client computer of the first plurality of client computers over a network, a first request for a first item associated with a first base item on the web page, wherein the first request includes information associated with the first base item, and wherein the first request is received upon a first interaction with the integration plugin component by at least one of the first plurality of client computers;

in response to receiving the first request, selecting, by the optimization module from the memory, a first template associated with the first base item from the first set of templates;

selecting, by the optimization module, the first item using the information associated with the first base item;

transmitting, over the network via the integration plugin component, the first template to the first client computer that sent the first request for display, wherein the first template includes a description of one or more items including the first item and an interactive component for selecting the first item; and receiving, by the optimization module from the first client computer over the network via the integration plugin component, interaction data specifying one or more interactions made by the first client computer with the first template on the web page, the interaction data including an indication whether the first item was included in an interaction via the interactive component for selecting the first item;

analyzing, by the optimization module, the interaction data to determine a performance metric for each of the first set of templates stored in the memory, wherein determining the performance metric comprises computing a conversion rate for the first template based on a frequency of inclusion of the first item in the interactions;

generating a second set of templates by:
dynamically reassigning a set of items including the first item to the first set of templates based on the performance metrics, and
replacing at least one or more templates of the first set of templates based on the performance metrics; and for each of a second plurality of requests associated with a second plurality of client computers:
receiving, by the application from a second client computer of the second plurality of client computers over the network, a second request for a second item associated with a second base item on the web page, wherein the second request includes information associated with the second base item, and wherein the second request is received upon a second interaction with the integration plugin component by at least one of the second plurality of client computers;

in response to receiving the second request, selecting, by the optimization module from the memory, a second template associated with the second base item from the second set of templates;

selecting, by the optimization module, the second item using the information associated with the second base item; and transmitting, over the network via the integration plugin component, the identified second template to the second client computer that sent the second request for display, wherein the second template includes a description of one or more items including the second item and an interactive component for selecting the second item.

2. The method of claim 1, wherein the first template and/or the second template includes multiple interactive components.

3. The method of claim 2, wherein each of the multiple interactive components correspond to a respective item, each associated with a same base item.

4. The method of claim 3, wherein each of the multiple interactive components are displayed on the web page at a same time.

5. The method of claim 1, wherein the one or more interactions made by the first client computer include a selection of an interactive component that causes a change in the web page, the change indicating a completion of the first interaction with the web page will occur when another interactive component of the web page is selected.

6. The method of claim 5, wherein the other interactive component is part of the first template.

7. The method of claim 1, further comprising:
in response to receiving the interaction data, determining one or more additional items associated with the first base item to present in the first template.

8. The method of claim 1, wherein a match rate for the first template is analyzed to determine the performance metric, and wherein the match rate comprises matching items.

9. The method of claim 1, wherein the second template is selected based on a round-robin strategy.

10. The method of claim 1, wherein the second template is selected based on its dissimilarity to the at least one or more replaced templates from the first set of templates.

11. The method of claim 1, wherein the second template is selected randomly.

12. The method of claim 1, wherein the second template is selected based on a given distribution.

13. The method of claim 1, wherein the replacing of the at least one or more templates of the first set of templates to form the second set of templates comprises:
identifying one or more replacement templates that are dissimilar to the one or more templates of the first set of templates.

14. The method of claim 1, wherein the identifying of the first template from the first set of templates is based on a rule setting a percentage of traffic to allocate to the first template from among the first set of templates.

15. The method of claim 1, wherein the first interaction with the integration plugin component comprises receiving information input by a user at one of the first plurality of client computers.

16. The method of claim 1, wherein the first interaction with the integration plugin component is associated with selecting the first base item on the web page by a user at one of the first plurality of client computers.

17. The method of claim 1, wherein the first interaction with the integration plugin component is associated with clicking the first item on the web page by a user at one of the first plurality of client computers.

18. A computer product comprising a non-transitory machine-readable storage medium, including instructions that, when executed by one or more processors, cause the one or more processors to perform:
identifying, by an optimization module, a first set of templates for providing to a first plurality of client computers for displaying on a web page, wherein the first set of templates are stored in a memory and correspond with an integration plugin component that, when activated, is configured to add one or more interactive components to the web page;

for each of a first plurality of requests associated with the first plurality of client computers:
receiving, by an application from a first client computer of the first plurality of client computers over a network, a first request for a first item associated with a first base item on the web page, wherein the first request includes information associated with the first base item, and wherein the first request is received upon a first interaction with the integration plugin component by at least one of the first plurality of client computers;

in response to receiving the first request, selecting, by the optimization module from the memory, a first template associated with the first base item from the first set of templates;

selecting the first item using the information associated with the first base item;

transmitting, over the network via the integration plugin component, the first template to the first client computer that sent the first request, wherein the first template includes a description of one or more items including the first item and an interactive component for selecting the first item; and receiving, from the first client computer over the network via the integration plugin component, interaction data specifying one or more interactions made by the first client computer with the first template on the web page, the interaction data including an indication whether the first item was included in an interaction via the interactive component for selecting the first item;

analyzing, by the optimization module, the interaction data to determine a performance metric for each of the first set of templates stored in the memory, wherein determining the performance metric comprises computing a conversion rate for the first template based on a frequency of inclusion of the first item in the interactions;

generating a second set of templates by:
dynamically reassigning a set of items including the first item to the first set of templates based on the performance metrics, and
replacing at least one or more templates of the first set of templates based on the performance metrics; and for each of a second plurality of requests associated with a second plurality of client computers:
receiving, by the application from a second client computer of the second plurality of client computers over the network, a second request for a second item associated with a second base item on the web page, wherein the second request includes information associated with the second base item, and wherein the second request is received upon a second interaction with the integration plugin component by at least one of the second plurality of client computers;
in response to receiving the second request, selecting, by the optimization module from the memory, a second template associated with the second base item from the second set of templates;
selecting, by the optimization module, the second item using the information associated with the second base item; and
transmitting, over the network via the integration plugin component, the identified second template to the second client computer that sent the second request, wherein the second template includes a description of one or more items including the second item and an interactive component for selecting the second item.

19. The computer product of claim 18, wherein the first template and/or the second template includes multiple interactive components.

20. The computer product of claim 19, wherein each of the multiple interactive components correspond to a respective item, each associated with a same base item.

21. The computer product of claim 20, wherein each of the multiple interactive components are displayed on the web page at a same time.

22. The computer product of claim 18, wherein the one or more interactions made by the first client computer include a selection of an interactive component that causes a change in the web page, the change indicating a completion of the first interaction with the web page will occur when another interactive component of the web page is selected.

23. The computer product of claim 22, wherein the other interactive component is part of the first template.

24. The computer product of claim 18, wherein the instructions further cause the one or more processors to perform:
in response to receiving the interaction data, determining one or more additional items associated with the first base item to present in the first template.

25. The computer product of claim 18, wherein a match rate for the first template is analyzed to determine the performance metric, and wherein the match rate comprises matching items.

26. The computer product of claim 18, wherein the second template is selected based on a round-robin strategy.

27. The computer product of claim 18, wherein the second template is selected based on its dissimilarity to the at least one or more replaced templates from the first set of templates.

28. The computer product of claim 18, wherein the second template is selected randomly.

29. The computer product of claim 18, wherein the second template is selected based on a given distribution.

30. The computer product of claim 18, wherein the replacing of the at least one or more templates of the first set of templates to form the second set of templates comprises:
identifying one or more replacement templates that are dissimilar to the one or more templates of the first set of templates.

31. The computer product of claim 18, wherein the identifying of the first template from the first set of templates is based on a rule setting a percentage of traffic to allocate to the first template from among the first set of templates.

32. The computer product of claim 18, wherein the first interaction with the integration plugin component comprises receiving information input by a user at one of the first plurality of client computers.

33. The computer product of claim 18, wherein the first interaction with the integration plugin component is associated with selecting the first base item on the web page by a user at one of the first plurality of client computers.

34. The computer product of claim 18, wherein the first interaction with the integration plugin component is associated with clicking the first item on the web page by a user at one of the first plurality of client computers.

* * * * *